United States Patent
Zhang et al.

(10) Patent No.: US 7,593,561 B2
(45) Date of Patent: Sep. 22, 2009

(54) COMPUTER-AIDED DETECTION OF MICROCALCIFICATION CLUSTERS

(75) Inventors: Daoxian H. Zhang, Los Gatos, CA (US); Patrick B. Heffernan, Campbell, CA (US); Yue Shen, Santa Clara, CA (US)

(73) Assignee: Carestream Health, Inc., Rochester, NY (US)

( * ) Notice: Subject to any disclaimer, the term of this patent is extended or adjusted under 35 U.S.C. 154(b) by 594 days.

(21) Appl. No.: 11/284,570

(22) Filed: Nov. 22, 2005

(65) Prior Publication Data

US 2006/0147101 A1    Jul. 6, 2006

Related U.S. Application Data

(60) Provisional application No. 60/631,154, filed on Jan. 4, 2005.

(51) Int. Cl.
*G06K 9/00* (2006.01)
*G06K 9/46* (2006.01)
*G06K 9/20* (2006.01)
*A61B 6/04* (2006.01)

(52) U.S. Cl. .................. 382/130; 382/132; 382/190; 382/283; 378/37

(58) Field of Classification Search ......... 382/128–132, 382/155–162, 176, 257; 600/425, 443; 128/922–924
See application file for complete search history.

(56) References Cited

U.S. PATENT DOCUMENTS

| | | | |
|---|---|---|---|
| 4,907,156 A | | 3/1990 | Doi et al. |
| 5,260,871 A | * | 11/1993 | Goldberg ............. 600/320 |
| 5,537,485 A | * | 7/1996 | Nishikawa et al. ...... 382/130 |
| 5,666,434 A | * | 9/1997 | Nishikawa et al. ...... 382/128 |
| 5,832,103 A | * | 11/1998 | Giger et al. ............. 382/130 |
| 5,857,030 A | * | 1/1999 | Gaborski et al. ........ 382/132 |
| 5,982,916 A | * | 11/1999 | Kuhn .................... 382/132 |
| 5,984,870 A | * | 11/1999 | Giger et al. ............. 600/443 |
| 5,999,639 A | | 12/1999 | Rogers et al. |
| 6,014,452 A | | 1/2000 | Zhang et al. |

(Continued)

OTHER PUBLICATIONS

Nico Karssemeijer, Adaptive Noise Equalization and Recognition of Microcalcification Clusters In Mammograms, International Journal of Pattern Recognition and Artificial Intellegence, vol. 7, No. 6 (1993) pp. 1357-1376.

(Continued)

*Primary Examiner*—Vikkram Bali
*Assistant Examiner*—Andrae S Allison

(57) ABSTRACT

A method for computer-aided detection of microcalcification clusters using a digital computer obtains digital mammography data for a single view image and normalizes and filters the image data to reduce noise. A first mask is generated and applied to the image data for defining the breast structure, forming a first cropped image. A second mask is generated and applied to the image data for defining muscle structure, forming a second cropped image. An artifact mask corresponding to vascular calcifications and known imaging artifacts is generated and applied to the first and second cropped images, defining first and second artifact-masked cropped images. In a repeated sequence, portions of each artifact-masked cropped image are processed using an enhancement algorithm and reducing edge effects to obtain a set of microcalcification cluster candidates and suspected microcalcification clusters. Image processing algorithms remove false positives from the listing of microcalcification clusters and classify candidate microcalcification clusters to identify true positives.

6 Claims, 10 Drawing Sheets

U.S. PATENT DOCUMENTS 6,205,236 B1 * 3/2001 Rogers et al. ............... 382/132
6,654,728 B1 * 11/2003 Li et al. ..................... 706/2
6,738,499 B1 * 5/2004 Doi et al. ................... 382/128
6,801,645 B1 * 10/2004 Collins et al. .............. 382/130
7,123,762 B2 * 10/2006 Giger et al. ................ 382/132
2003/0165262 A1    9/2003 Nishikawa et al.

OTHER PUBLICATIONS

H. Neiber et al., Local Contrast Enhancement for the Detection of Microcalcifications, Proc. 5th Intl. Worhsop Digital Mammography, pp. 598-604, 2000.

* cited by examiner

```
sbyte [] wts = { -3, -3, -3, -3, -3, -3, -3, -3, -3, -3, -3, -3, -3,
-3, 0, 0, 0, 0, 0, 0, 0, 0, 0, 0, 0, -3,
-3, 0, 0, 0, 0, 0, 0, 0, 0, 0, 0, 0, -3,
-3, 0, 0, -6, -6, -6, -6, -6, -6, -6, 0, 0, -3,
-3, 0, 0, -6, 0, 0, 0, 0, 0, -6, 0, 0, -3,
-3, 0, 0, -6, 0, 32, 32, 32, 0, -6, 0, 0, -3,
-3, 0, 0, -6, 0, 32, 32, 32, 0, -6, 0, 0, -3,
-3, 0, 0, -6, 0, 32, 32, 32, 0, -6, 0, 0, -3,
-3, 0, 0, -6, 0, 0, 0, 0, 0, -6, 0, 0, -3,
-3, 0, 0, -6, -6, -6, -6, -6, -6, -6, 0, 0, -3,
-3, 0, 0, 0, 0, 0, 0, 0, 0, 0, 0, 0, -3,
-3, 0, 0, 0, 0, 0, 0, 0, 0, 0, 0, 0, -3,
-3, -3, -3, -3, -3, -3, -3, -3, -3, -3, -3, -3, -3};
```

FIG. 5

COMPUTER-AIDED DETECTION OF MICROCALCIFICATION CLUSTERS

CROSS REFERENCE TO RELATED APPLICATION

Reference is made to and priority is claimed from commonly assigned U.S. Provisional Application No. 60/631,154, entitled "COMPUTER AIDED DETECTION OF MICROCALCIFICATION CLUSTERS", filed on Jan. 4, 2005 in the name of Zhang, which is incorporated herein by reference.

FIELD OF THE INVENTION

The present invention generally relates to medical image analysis, and more particularly to an automated method for identifying and assessing clustered microcalcifications in a medical image.

BACKGROUND OF THE INVENTION

The benefits of computer-aided diagnosis in radiology in general, and particularly in mammography, are widely recognized. There have been efforts directed toward computer-aided methods that assist the diagnostician to correctly and efficiently identify problem areas detected in a mammography image and to improve the accuracy with which diagnoses are made using this information.

In mammography, it is recognized that early detection of microcalcification structures in the breast can help to diagnose cancer in early stages where treatment offers more hope of success than at more advanced stages. Research shows that calcifications are typically formed from various salts of calcium, magnesium, or phosphorus collected within the breast as a result of secretions within structures that have become thickened and dried. Microcalcification (abbreviated as MCC) structures tend to take the shape of the cavity in which they form so that analysis of their morphology, density, size, and distribution can help determine whether they are benign or malignant.

Calcification structures are detected in X-ray images of the breast, which are provided as digital data for analysis and assessment. Various calcification attributes can be extracted from this data and used to distinguish benign from suspected malignant calcifications. Benign calcifications tend to appear as single spots (rather than clusters) and have a regular shape, while malignant calcifications most often appear in clusters of spots and are of irregular shapes.

Among the characteristics employed by diagnosticians in working with x-ray images of the breast, the following guidelines can be considered:

- Large (>1 mm diameter), coarse calcifications are likely to be benign, but malignant MCCs tend to be punctuate, 0.5 mm or smaller;
- Single calcifications are more likely to be benign;
- Rounded calcifications of equal size are likely to be benign;
- Calcifications scattered through both breasts are more likely to be associated with benign disease;
- Groups of calcifications of mixed size with irregular shapes are more characteristic of malignant than benign condition;
- Clusters of fine calcifications are more likely to signify malignancy;
- Rows of fine calcifications within the ducts are likely to signify malignancy;
- Short rods of calcification, particularly if they branch, are highly likely to signify malignancy;
- Grossly irregular whorled cluster shapes are likely to signify malignancy; and
- In malignant calcification clusters, the average distance between calcifications is typically less than 1 mm.

Employing these characteristics, image analysis methods used in Computer Aided Diagnostics (CAD) systems extract and quantify image data relating to shape, edge character, and intensity at both the spot and cluster level. The shape can be characterized according to its geometric features such as compactness, perimeter, elongation, ratio of moments, and eccentricity. The edge character shows the comparison of the calcification with its background, which can be analyzed by the gradient of the spot boundary and the contrast between the spot and the background. The intensity-based features of the calcification include the mean intensity of a spot as well as the maximum intensity, the deviation of the intensity, the moment, and the like.

The results of CAD analysis serve as an aid to the diagnostician, assisting to highlight areas of particular interest and to eliminate areas that are not suspicious.

In the literature, some standard abbreviations or acronyms are used in the discussion of mammography accuracy, including:

- FP—False Positive, an error in which a benign structure is incorrectly identified as malignant;
- FN—False Negative, an error in which a malignant structure is incorrectly identified as benign;
- TP—True Positive, a result in which a malignant structure is correctly identified; and
- TN—True Negative, a result in which a benign structure is correctly identified.

Microcalcifications can be subtle in appearance. A number of factors can adversely influence the percentage of correct results obtained from the CAD system. Errors can result from factors such as poor image quality, improper positioning of the patient, film variations, scanner performance, obscuration from fibroglandular tissue, and other problems. Because of these difficulties, some view the success rate in correctly identifying and diagnosing microcalcification structures as disappointing.

Some proposals have been made for improving the accuracy of diagnosis for microcalcification detection and classification.

U.S. Pat. No. 4,907,156 entitled "Method And System For Enhancement And Detection Of Abnormal Anatomic Regions In A Digital Image" to Doi et al. is directed to the use of a local gray level threshold that varies with the standard deviation of surrounding pixel values for isolating microcalcifications.

U.S. Pat. No. 5,999,639 entitled "Method and System for Automated Detection of Clustered Microcalcifications from Digital Mammograms" to Rogers et al. relates to a detection and classification sequence including automatic image cropping, filtering including use of a difference of Gaussian filtering enhancement, clustering, and feature computation U.S. Pat. No. 5,537,485 entitled "Method for Computer-Aided Detection of Clustered Microcalcifications from Digital Mammograms" to Nishikawa et al. describes a cluster filtering method using successively applied thresholds to isolate suspected malignant calcifications from benign structures.

U.S. Pat. No. 6,014,452 entitled "Method and System for Using Local Attention in the Detection of Abnormalities in Digitized Medical Images" to Zhang et al. describes segmentation and thresholding methods used to detect suspicious clustered microcalcification structures.

U.S. Patent Application Publication No. 2003/0165262 by Nishikawa et al. relates to a classification method for structures in a medical image employing a difference of Gaussians filter and various thresholding techniques, followed by the deployment of a feed-forward artificial neural network (ANN) trained to distinguish malignant from benign structures according to combinations of measured characteristics.

U.S. Pat. No. 5,857,030 entitled "Automated Method and System for Digital Image Processing of Radiologic Images Utilizing Artificial Neural Networks" to Gaborski et al. discloses an automated method for detection of microcalcification structures in a medical image using successive processing stages including filtering and segmentation, with a final pattern classification stage using neural network techniques;

An article entitled "Adaptive noise equalization and recognition of microcalcification clusters in mammograms" *International Journal of Pattern Recog and Artificial Intelligence*, vol 7, 1357-1376 1993, N. Karssemeijer, describes resealing the digital image to minimize effects of noise.

An article entitled "Local contrast enhancement for the detection of microcalcifications" in *Proc 5$^{th}$ Int. Workshop Digital Mammography*, pp. 598-604, 2000 by H. Neiber, T. Muller, R. Stotzka describes the use of a local threshold for identifying microcalcification structures, dependent on the difference between local maximum and mean gray levels.

While such methods may have achieved certain degrees of success in their particular applications, there is still need for improvement. The percentage of FN and FP errors is still too high when using conventional CAD systems. Proposed solutions have often tended to focus on ever more sophisticated image processing algorithms for reducing FN and FP errors. However, even using advanced neural networks and other powerful image analysis and decision-making tools may only provide incremental improvement over existing methods.

Thus, there exists a need for an accurate automated method for identifying and assessing clustered structures in a medical image.

SUMMARY OF THE INVENTION

The present invention provides a method for computer-aided detection of microcalcification clusters. The method uses a digital computer and includes steps of: a) obtaining digital mammography data for a single view image; b) normalizing the single view image data; c) filtering the single view image data to reduce the image noise; d) generating and applying a first mask to the single view image data for defining the breast structure, forming a first cropped image thereby and generating and applying a second mask to the single view image data for defining the muscle structure, forming a second cropped image thereby; e) generating, for each of the first and second cropped images, an artifact mask corresponding to vascular calcifications and known imaging artifacts; f) applying, to each of the first and second cropped images, the corresponding artifact mask, defining corresponding first and second artifact-masked cropped images thereby; g) processing portions of each artifact-masked cropped image by: (g1) applying an enhancement algorithm for enhancing small particles in the artifact-masked cropped image, forming an enhanced artifact-masked cropped image thereby; (g2) reducing edge effects introduced by artifacts in the enhanced artifact-masked cropped image; (g3) obtaining a set of microcalcification cluster candidates according to a segmentation threshold; h) repeating step g) at least one time for each of the first and second artifact-masked cropped images, using an alternate enhancement algorithm in sub-step (g1); i) combining results from steps g) and h) to form a listing of suspected microcalcification clusters; j) applying image processing algorithms to remove FPs from the listing of suspected microcalcification clusters to obtain an initial listing of candidate microcalcification clusters; k) extracting features of each microcalcification in the candidate microcalcification cluster and classifying each microcalcification to remove FP microcalcifications; l) regrouping the remaining microcalcifications to form a regrouped listing of candidate microcalcification clusters; and m) extracting features of each microcalcification cluster in the regrouped listing of candidate microcalcification clusters and classifying each microcalcification cluster in the regrouped microcalcification cluster listing to identify TPs.

There are some advantages of the present invention. For example the method allows the use of multiple views for obtaining a more accurate classification for the patient. In addition, the method allows the use of history data from previous images for automated comparison. Further, a state vector neural network is employed using a kernel-based learning method for improved efficiency. The method provides efficient use of masking to more effectively isolate candidate tissue from other structures that can interfere with accurate analysis. Yet further, the method uses adaptable thresholding to detect possible microcalcifications, based on statistical information from the image itself and on characteristics of imaged structures.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings.

FIG. 5 shows a convolution kernel data structure for enhancing image data.

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

It is noted that the method of the present invention uses digital computer hardware and software components, but is independent of any particular component characteristics such as architecture, operating system, or programming language, for example. In general, the type of system equipment that is conventionally employed for scanning, processing, and classification of mammography image data, or of other types of medical image data, is well known and includes at least some type of digital computer or computer workstation, having a logic processor which may be dedicated solely to the assessment and maintenance of medical images or may be used for other data processing functions in addition to image processing. Typically, results display on a monitor screen or, optionally, results may be printed. Characteristics such as processing speed, memory and storage requirements, networking and access to images, and operator interface, for example, would be suitably selected for the image analysis function and the viewing environment, using practices and guidelines that are well known in the medical image processing arts.

The method of the present invention takes advantage of data that is available from multiple views taken during mammography. Typically, two views are taken, along cranio-caudal (CC) and mediolateral oblique (MLO) planes. Except as specifically noted, the methods of the present invention can be applied to either or both CC and MLO views and, more generally, to other types of medical image capable of showing microcalcifications.

Generally, the method of the present invention first performs separate single-view processing on each obtained mammography image, for both left and right sides, from both CC and MLO views. Following an initial processing sequence, candidate MCC areas are first isolated from other structures, such as vascular structures, for example. Then, processing of paired views is performed, helping to further distinguish candidate clusters from surrounding tissue. A final view combination process then applies imaging and statistical thresholds to isolate the most likely areas of concern as the most likely set of candidates.

The description that follows gives more fully detailed information about each individual part of the image processing sequence.

Single-View Processing

Figure 1:
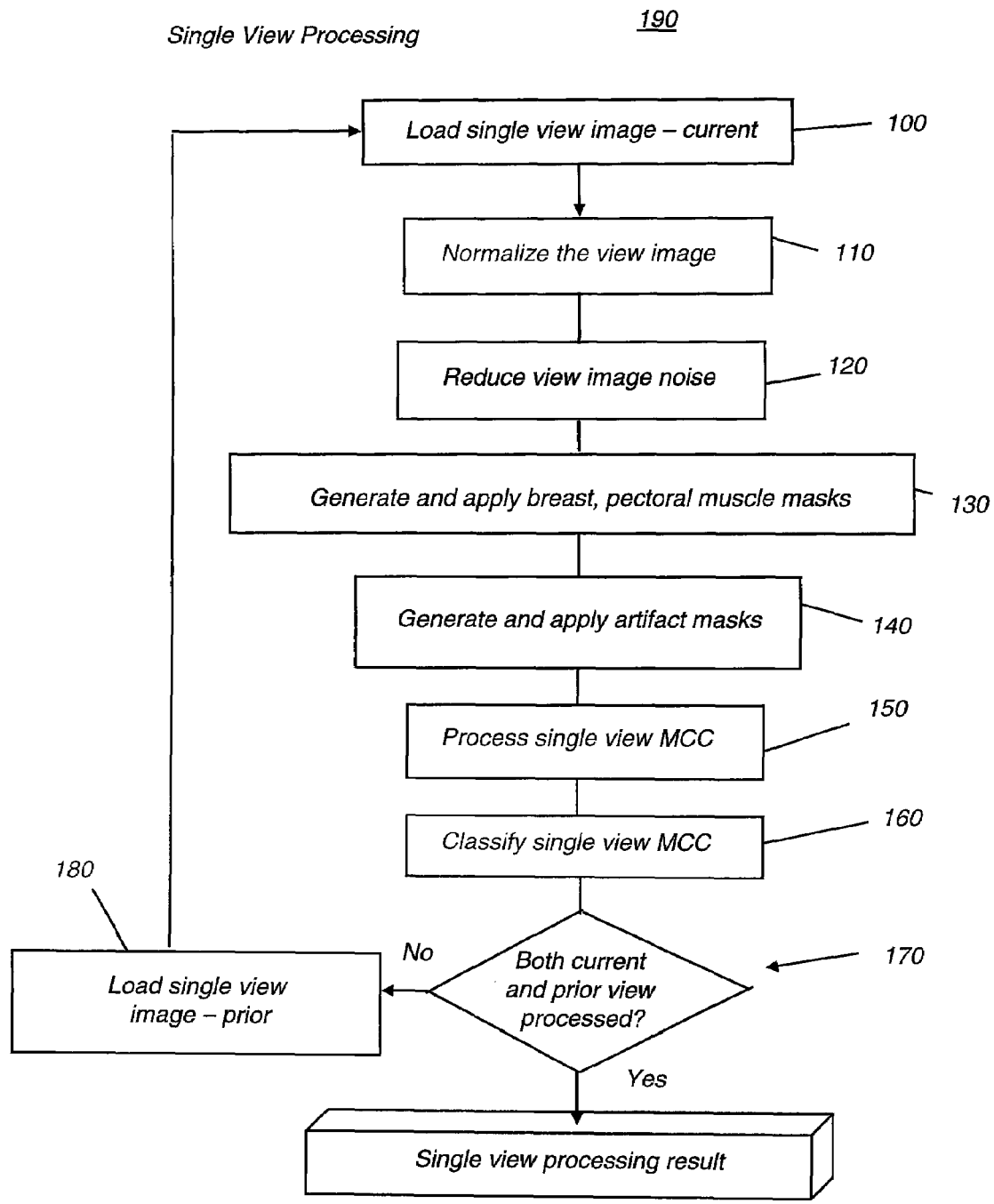
FIG. 1 is a logic flow diagram of the single view processing sequence.

Referring to FIG. 1, there is shown a logic flow diagram of a single view processing sequence 190 according to one embodiment. In a preparation step 100, image data from the single image is loaded and accessed by the image analysis system. A normalization step 110 then processes the image data to obtain suitable values for more straightforward manipulation and interpretation. This includes a statistical normalization that allows image data that has possibly been obtained at different times, potentially at different possible resolutions and having specific characteristics of dynamic range, to be handled in a consistent fashion. Methods for normalization may include histogram-based normalization or a tissue center (mean) equalization method, familiar to those skilled in the image processing art. A noise reduction step 120 follows, in which the analysis system conditions the image data, filtering or subsampling the image in some way to reduce, the noise level, including high-frequency "white noise" artifacts that may result from exposure conditions, film characteristics, film development variations, and scanner noise. Noise reduction techniques include conventional subsampling techniques such as applying a suitable filter for eliminating or suppressing image content above an appropriate spatial frequency.

Once these preparatory normalization and filtering processes have been executed, it is necessary to isolate those portions of the image that are to be analyzed for microcalcifications from other portions of the image. The next few steps perform this isolation using a successive set of masks, sequentially applied to the image data for the particular view being processed. In a first mask generation and application step 130, the analysis system generates one or more masks for the breast outline, as well as one or more masks for muscular structure within the breast. Tissue differences require that these two areas be analyzed separately. Mask generation techniques for structures of predictable contour are well known to those skilled in the imaging arts. This masking step isolates the breast tissue of interest from surrounding tissue for assessment, forming a cropped image thereby.

Artifact Mask Generation and Application

Once masks have been generated to isolate the different tissue areas of the breast, including masks for identifying the breast outline and pectoral structure from the image, an artifact mask generation and application step 140 is then executed. Step 140 provides yet another level of masking, proactively helping to eliminate a number of known structures and imaging anomalies that could otherwise lead to FP indications. Among artifacts that must be removed from consideration in order to detect microcalcifications more accurately are imaging anomalies caused by film shot noise, large benign calcifications, vascular calcifications, and foreign objects, for example. Characteristics of artifacts that are masked using one or more artifact masks include relatively bright gray level intensity when compared to background and other tissues, objects, and features exhibiting sharp edges. Benign calcifications typically appear as having regular shapes, such as circular, and are larger than typical malignant microcalcifications, typically in excess of 600 microns. Vascular calcifications typically appear as disconnected curve tracks, with widths ranging from 700 to 1500 microns.

In generating artifact masks in artifact mask generation and application step 140, large benign calcifications are typically masked using edge-detection techniques. The image is downsized and smoothed to reduce the likelihood of inadvertently masking possible microcalcifications. A Sobel operator or other suitable technique is used to enhance edges and applied according to the area defined using the breast mask to remove bright borders.

Following this, a segmentation step is employed, in which the following steps are performed:

(i) Each segment is defined by a bounding box. One dimension of the bounding box for each segmentation must be larger than a predefined "large calcification" size (for example 22 pixels) and both dimensions of the bounding box must be smaller than half the size of the full breast image.

(ii) The elongation of the segmentation is checked to determine if it is smaller than a predetermined value (for example, with a length:width ratio of 3). Both dimensions of the bounding box must be larger than another predefined "large calcification" size (typically 22+6 pixels)

(iii) Provided that the elongation is equal to or exceeds the predefined "large calcification" size, the statistical mean of the segmented image must exceed a predetermined intensity level that can be variable, depending on image characteristics. Segmentation is then modified by a straightforward threshold method that applies an intensity threshold and processes those pixels whose value exceeds the threshold. The intensity threshold used can be empirically determined or calculated using statistical data from the cropped image being analyzed.

With these steps, large benign calcifications and other artifacts that do not meet critical criteria for microcalcifications can be masked and effectively removed from the tissue area that will be further analyzed. Additional image processing tools are used to further define the artifact, including morphological closure and related operations.

Simple edge detection operations can also be used for generating a vascular mask when operating on different parameters. However performance may not be sufficient for masking vascular calcifications in all cases using such methods. Simple edge detection, without other supporting imaging techniques, can unintentionally break vascular tissue into small segments, so as to make them difficult to separate from true malignant microcalcifications. In a bias under-edge detection based method, the edge contour represents the object and can be closed by the morphological operations. Empirical results show that edge-detection algorithms may be effective for detecting sharp edges, but are somewhat weak for detecting the whole object. Thus, a local contrast based method, which is composed of local contrast detection and bandpass filtering, is used to detect the object.

One method combines two methods.

The edge method is as follows:
 1. Perform a smoothing operation to filter out the small, possible "true" microcalcifications.
 2. Perform morphological filtering (dilation, erosion, closing, opening, and the like).
 3. Perform edge detection.
 4. Execute artifact segmentation.
 5. Perform morphological closing.

The local contrast method is as follows:
 1. Perform bandpass filtering.
 2. Perform local contrast detection.
 3. Execute morphological enhancement.
 4. Execute segmentation.
 5. Generate mask.
 6. Perform morphological closing.

Figure 6:
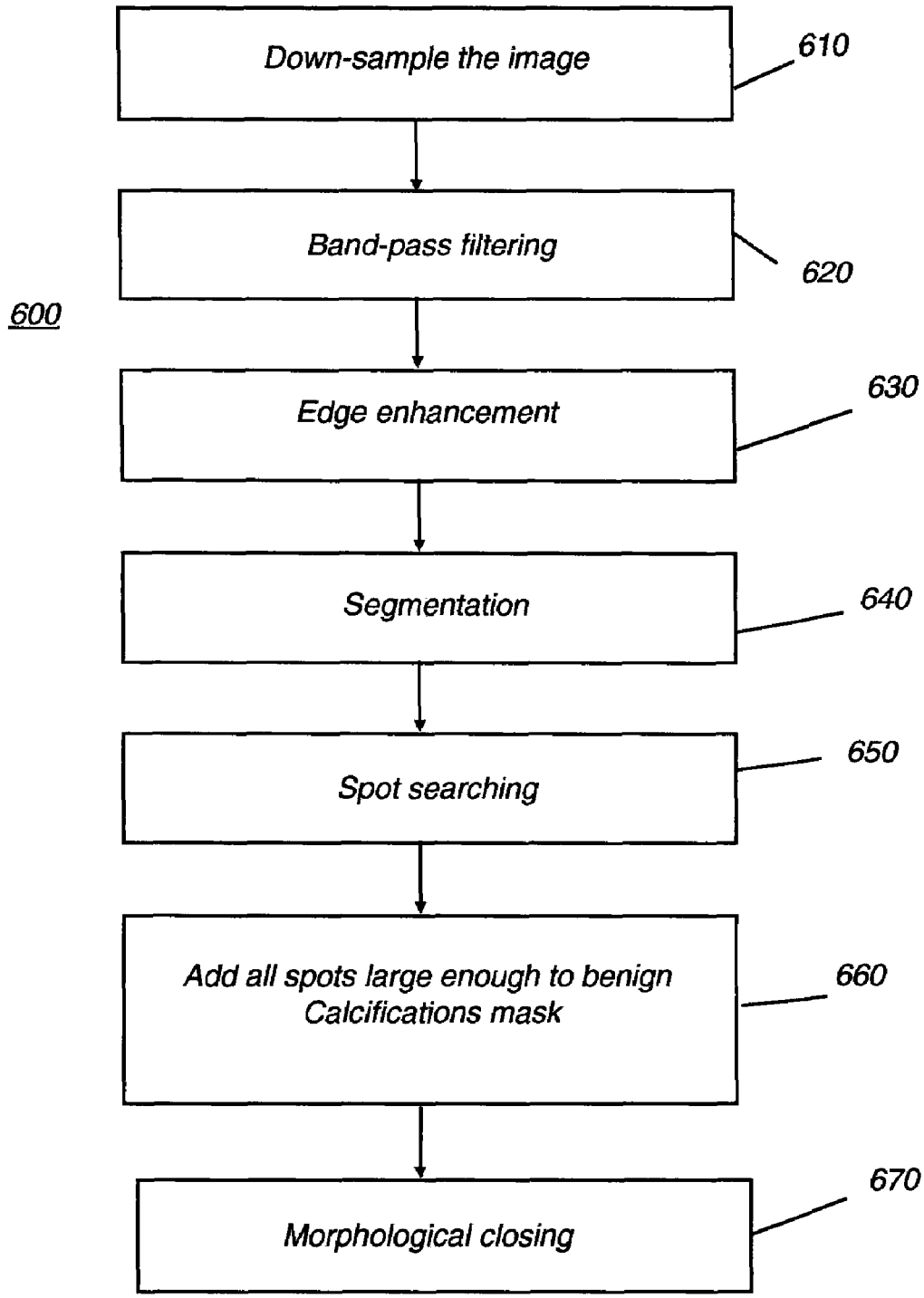
FIG. 6 is a logic flow diagram for an artifact mask generation sequence in one embodiment.

FIG. 6 gives a logic flow diagram for an artifact mask generation sequence 600 for benign calcifications. In a downsample step 610, the image is down-sampled, scaled down to prevent high-frequency components from being masked. A band-pass filter step 620 applies a band-pass filter to isolate areas of interest for masking. An edge enhancement step 630 provides edge enhancement for maskable features.

A segmentation step 640 is then used to segment the image for further analysis. This groups pixels with intensity above a given value. A spot searching step 650 is then executed to identify and collect suspected microcalcification structures determined to be benign, based on size, edge definition, shape, intensity, and other characteristics. A summation step 660 adds all suspected microcalcification structures of sufficient size to the benign mask. Finally, a morphological closing step 670, using imaging techniques well known to those skilled in the image analysis arts, is executed to complete the formation of the mask shape.

Figure 7:
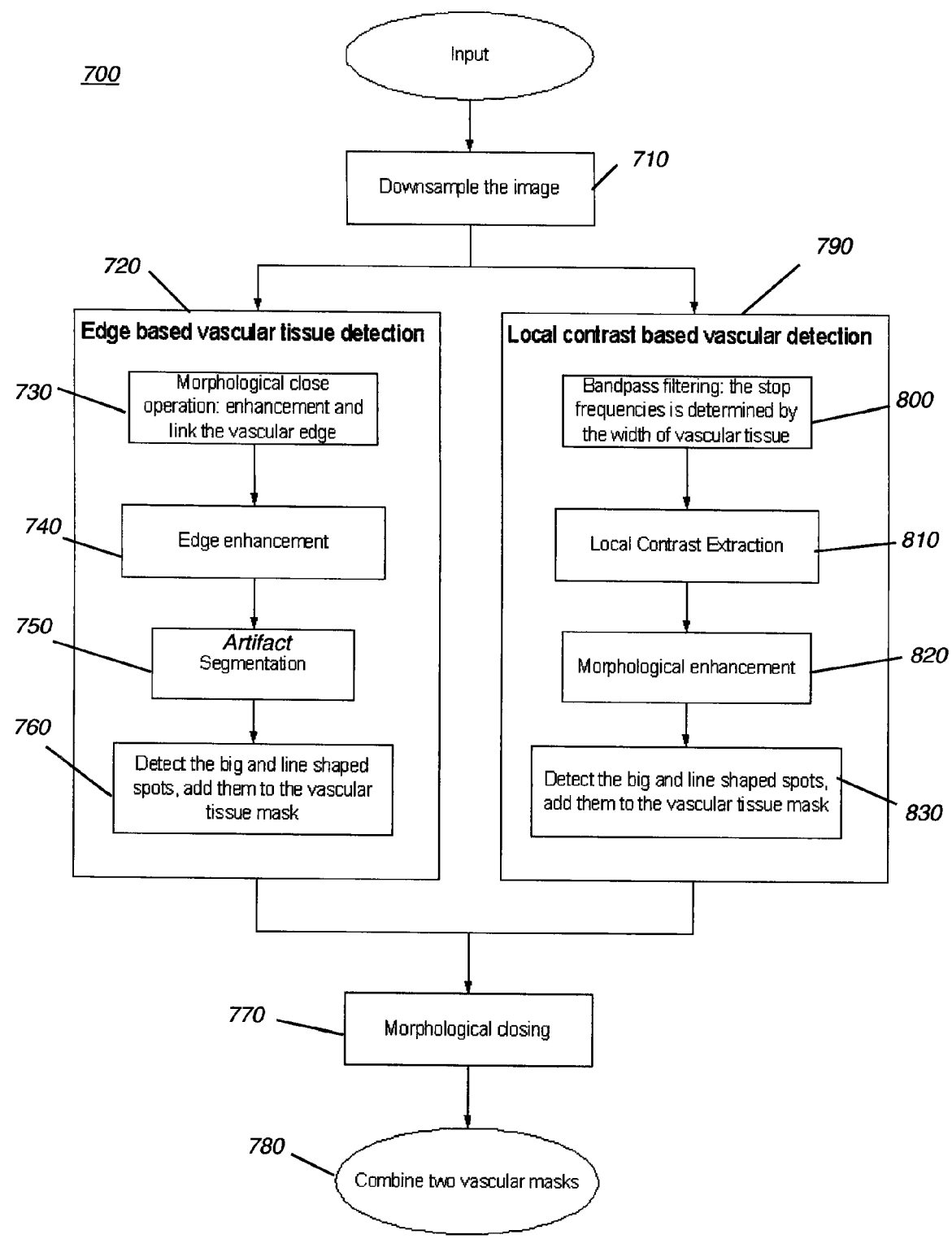
FIG. 7 is a logic flow diagram showing mask generation applied to vascular calcifications or other structures.

FIG. 7 gives a logic flow diagram for an artifact mask generation sequence 700 applied to vascular calcifications. Similar to the sequence for benign calcification masking, a downsample step 710 downsamples the image to eliminate high frequency content that is of interest since it may include microcalcifications, and to prevent this content from being masked. Two sequences are performed, shown as alternate processing paths in the flow chart of FIG. 7: an edge-based vascular tissue detection sequence 720 shown at the left, and a local contrast based vascular detection sequence 790 at the right.

In edge-based vascular tissue detection sequence 720, a morphological close step 730 is first executed in order to enhance and link the edges of vascular structures. An edge enhancement step 740 is then executed, followed by an artifact segmentation step 750. In a detection step 760 then, areas too large to be malignancies and following vascular courses are detected and added as candidates for vascular detection.

In one embodiment, edge enhancement step 740 is executed using convolution with an enhancement kernel, such as that shown in FIG. 5. A morphological open operation of the enhanced image is then executed. The resulting enhanced image border, which may have varying intensity and size based on scanned film characteristics, is then removed.

Referring again to FIG. 7, in local contrast based vascular detection sequence 790, a bandpass filtering step 800 is initially executed, with stop frequencies suitably specified for the width of vascular tissue structures. A local contrast extraction step 810 extracts local contrast data for use in subsequent image processing in this sequence. A morphological enhancement step 820 is then executed for improved shape definition. A detection step 830 is then performed to detect large and line-shaped areas and add them to the mask.

Following both edge-based vascular tissue detection sequence 720 and local contrast based vascular detection sequence 790, a morphological closing step 770 is performed, along with a combination step 780 for forming the final vascular mask from the results of edge-based vascular tissue detection sequence 720 and local contrast based vascular detection sequence 790. Combination of this data follows any of a number of conventional techniques for combining image data for the same image that has been analyzed in different ways. For example, a weighted addition could be used, in which pixel values are multiplied by a weighted fraction and added. Optionally, scalar multiplication of the instances of each value, followed by subtraction of the resulting values, could be used. Still other methods of combination are available, using techniques known to those knowledgeable in the image processing art.

Referring again to FIG. 1, a single view MCC processing step 150, described in more detail subsequently, is executed on the masked tissue in the enhanced artifact-masked cropped image. This step provides an output record or listing of the set of candidate clusters that require assessment. A single view MCC classification step 160 is then applied to each member of this set, extracting features of both microcalcifications and features of microcalcification clusters, testing each suspect structure under a set of learned rules in order to classify suspected microcalcification clusters. A loop control process 170 repeats the steps of single view processing sequence 190 for an image taken at an earlier exam session, if one is available, loaded during an optional preparation step 180. This use of earlier stored data helps to correlate information between sessions and may be of particular value to the diagnostician. This processing is separately performed on both tissue that has been provided using the breast mask and on tissue provided using the pectoral muscle mask.

It is noted that, with CAD mammography systems, the types of image artifacts that are removed using the artifact masks of the present invention are eliminated from the image data to isolate the set of candidate MCC clusters from healthy tissue. These image artifacts could lead to FP errors, since they tend to generate high-intensity images with sharp definition. Other types of CAD systems, however, discard these imaging artifacts at a later point in the image processing cycle. The generation and use of artifact masks, as practiced in the present invention, removes these artifacts earlier in the image processing sequence than with conventional image processing approaches, thereby eliminating them from the tissue areas that are subject to detailed image analysis. This method also presents a time saving, obviating the need to process image content containing these artifacts and to make decisions regarding this content.

Pair Views Processing

Conventional techniques for image analysis are often narrowly directed toward single-view assessment, rather than taking advantage of data available from different perspectives. The method of the present invention also enables comparison between data obtained in the current exam session and data taken at an earlier time.

Figure 2:
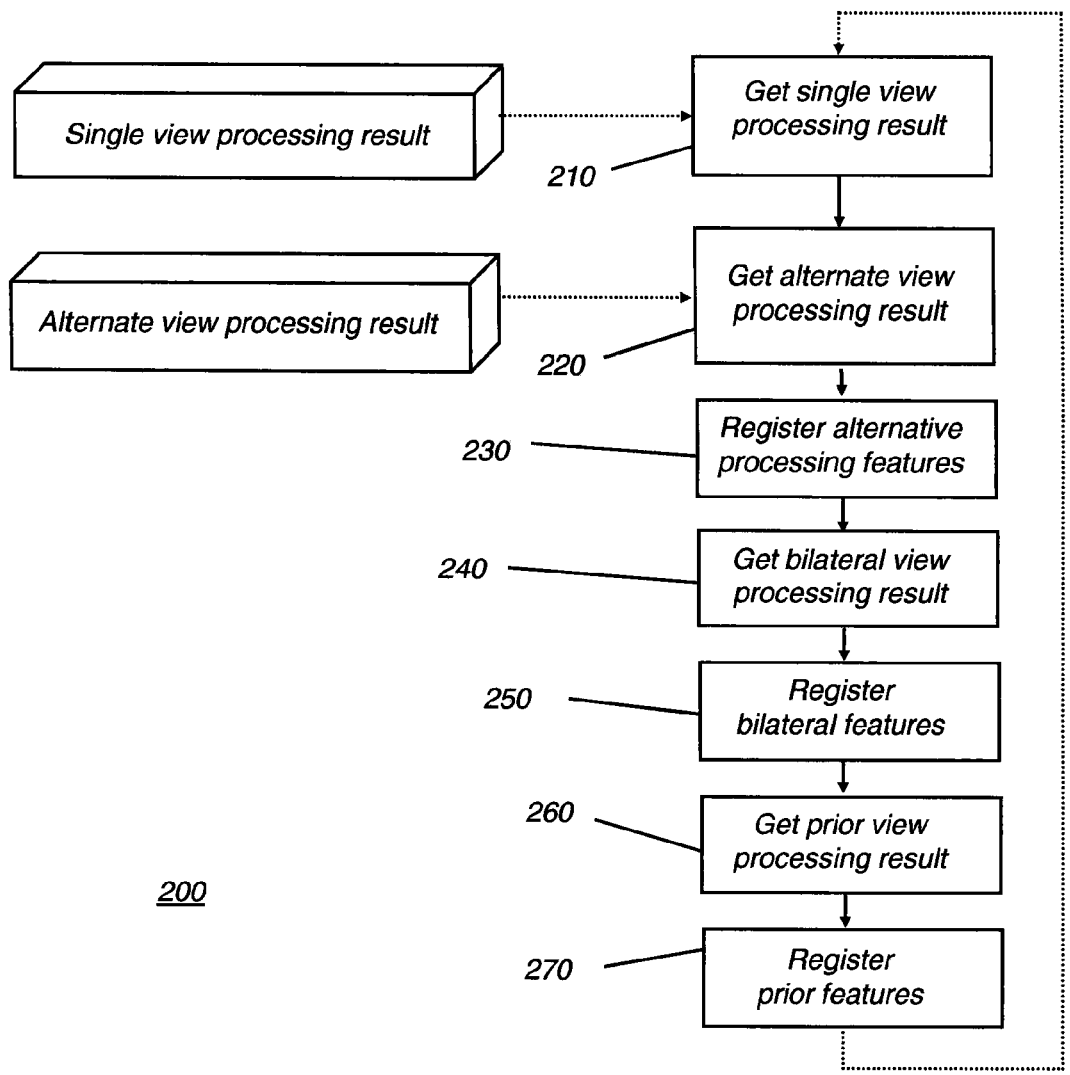
FIG. 2 is a logic flow diagram of the pair views processing sequence.

Referring to FIG. 2, there is shown a pair views processing sequence 200 that can be employed following single view processing sequence 190 of FIG. 1. In a get single view processing result step 210, the resulting identification of candidate structures that are suspicious, provided using the procedure outline in FIG. 1, is obtained. A get alternative views processing result step 220 is then executed to obtain the view for the other breast.

A register alternative views step 230 provides the needed registration for correlating each of the multiple views of each breast. A get bilateral view processing result step 240 then obtains results from the alternate breast. A register bilateral features step 250 then performs the corresponding registration for the other breast.

A get prior view processing result step 260 obtains stored results from steps 210, 220, 230, 240, and 250, where available, from an earlier exam. A register prior features step 270 then registers the detected features, similarly to step 250. The sequence of FIG. 2 can then be repeated for each patient. The result of pair views processing sequence 200 is a candidate set of suspected microcalcification clusters detected on both left and right sides.

Detailed Steps for Single View Processing

Figure 4A:
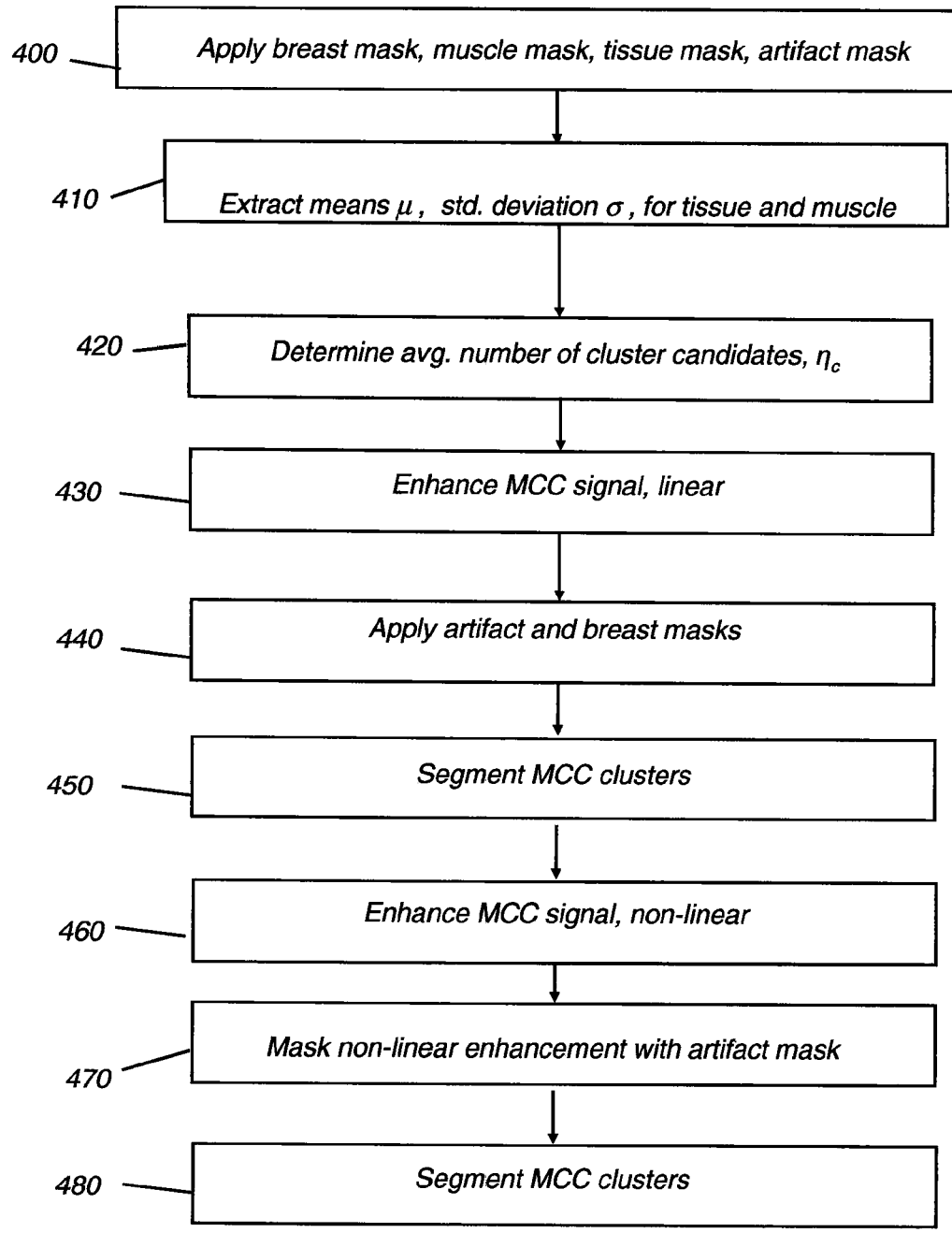
FIGS. 4A and 4B are two parts of a logic flow diagram for single view processing in one embodiment.
Figure 4B:
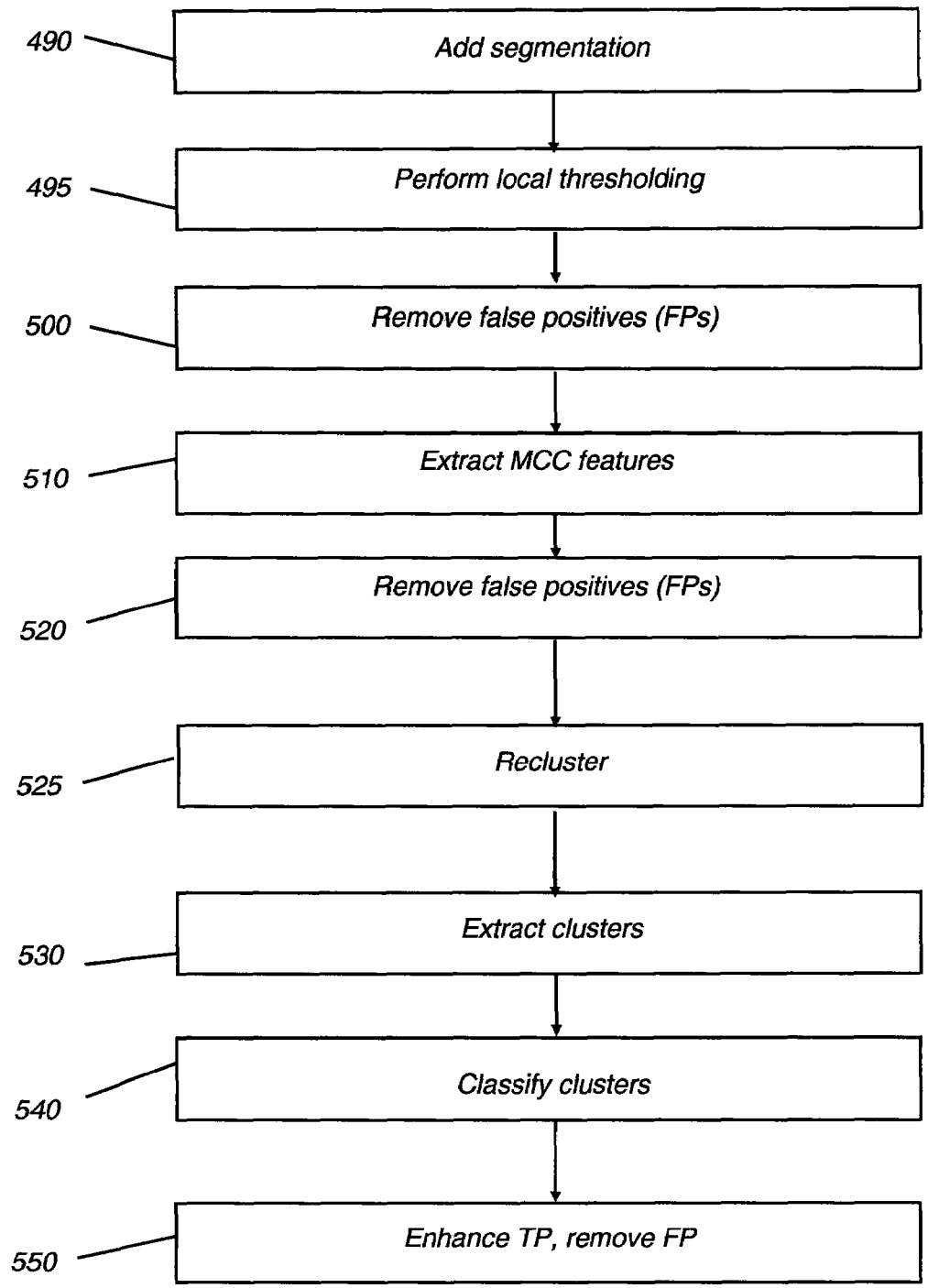

Referring now to FIGS. 4A and 4B, there are shown the steps used in the procedure for single view MCC processing step 150, used in single view processing sequence 190 as was shown in FIG. 1. The basic thrust of this process is to first generate a set of candidate MCC clusters for each image, based on various factors. Once this set is defined, the next sequence of steps methodically eliminates likely FPs from this set, reducing the number of candidates in the set in successive operations until this set contains only areas of the image that are highly suspicious as MCC clusters.

In an apply masks step 400, masks are generated and used to isolate areas of interest from areas of the obtained image in order to remove areas that have no relevance for MCC detection. The end-result of this step provides an artifact-masked cropped image that contains only tissue of interest for MCC detection.

The breast mask used in apply masks step 400 provides a contour masking for isolating tissue areas of the obtained image data from non-tissue areas. One or more muscle masks are then used to separately mask off pectoral muscle areas. These masks are of particular value for the MLO views. Both breast mask and muscle masks can be generated using methods well known in the mammography imaging art. Further tissue masking may also be required in order to mask other structures. Finally, an artifact mask, formed as described subsequently in more detail, is generated to eliminate benign and vascular tissue calcification structures from consideration. Each of these masks is applied to the image in order to effectively isolate the tissue of interest from unwanted artifacts and non-tissue areas, providing the artifact-masked cropped image needed for more accurate MCC detection.

In an extract statistical values step 410, the following values are calculated from the image data for each artifact-masked cropped image:

a) tissue mean and standard deviation;

b) muscle mean and standard deviation.

Step 410 is conducted since the different views (CC and MLO) and breast- or muscle-masked areas, as well as views from different patients, exhibit different tissue density and other key characteristics and need to be processed accordingly. Threshold settings and other processing variables used in subsequent image processing steps are based, in part, on the statistical values obtained in extract statistical values step 410.

The next step executed is a determine average number of cluster candidates step 420. In this step, based on the calculated mean and standard deviation values obtained in extract statistical values step 410, an average number of MCC cluster candidates, for the set of candidates that will be produced subsequently, is determined. This number, $\eta_c$, is based on empirical data analyzed by the inventors from an established database of mammography images having various characteristics. The number $\eta_c$, may vary from one case to the next, depending on factors such as tissue mean and standard deviation, for example. It has been observed, for example, that microcalcification detection for denser tissue is more successful when working with a higher number of candidate clusters. For less dense or fatty tissue, microcalcifications are generally easier to detect; thus a smaller number of candidates will suffice. The purpose of step 420, then, is to decide how large the set of candidate clusters should be, based on results from step 410, arriving at a reasonable number for $\eta_c$ that is both small enough to allow efficient computation and high enough to capture any potential MCC site when this set is generated.

An enhance MCC signal step 430, provides an enhancement function such as a linear image enhancement algorithm to condition image data and enhance any detected microcalcifications and MCC clusters. In one embodiment, this step executes a convolution operation using the kernel shown in FIG. 5. This particular kernel, applied over the full image area, provides a substantial amount of edge enhancement that is needed for subsequent cluster detection steps.

When the breast and artifact masks are initially applied in step 400, some undesirable edge effects can be generated. The unwanted enhancement that is provided to edge effects in step 430 necessitates a procedure to remove the edge effects. In an apply artifact and breast masks step 440, both artifact and breast masks are again used, applied as part of a process to remove these unwanted effects from the image data.

Adaptive Thresholding for Segmentation

The segmentation process generally assembles the set of candidate clusters from the masked and enhanced image data. The method of the present invention provides an adaptive thresholding method for segmentation, repeatedly adjusting and readjusting threshold settings as needed in order to provide a suitably sized set of candidate MCC clusters. This adaptive thresholding follows an iterative sequence that systematically adjusts threshold settings appropriately, with the increment of adjustment reduced in each step, converging toward the desired threshold value in a somewhat asymptotic fashion.

Figure 8:
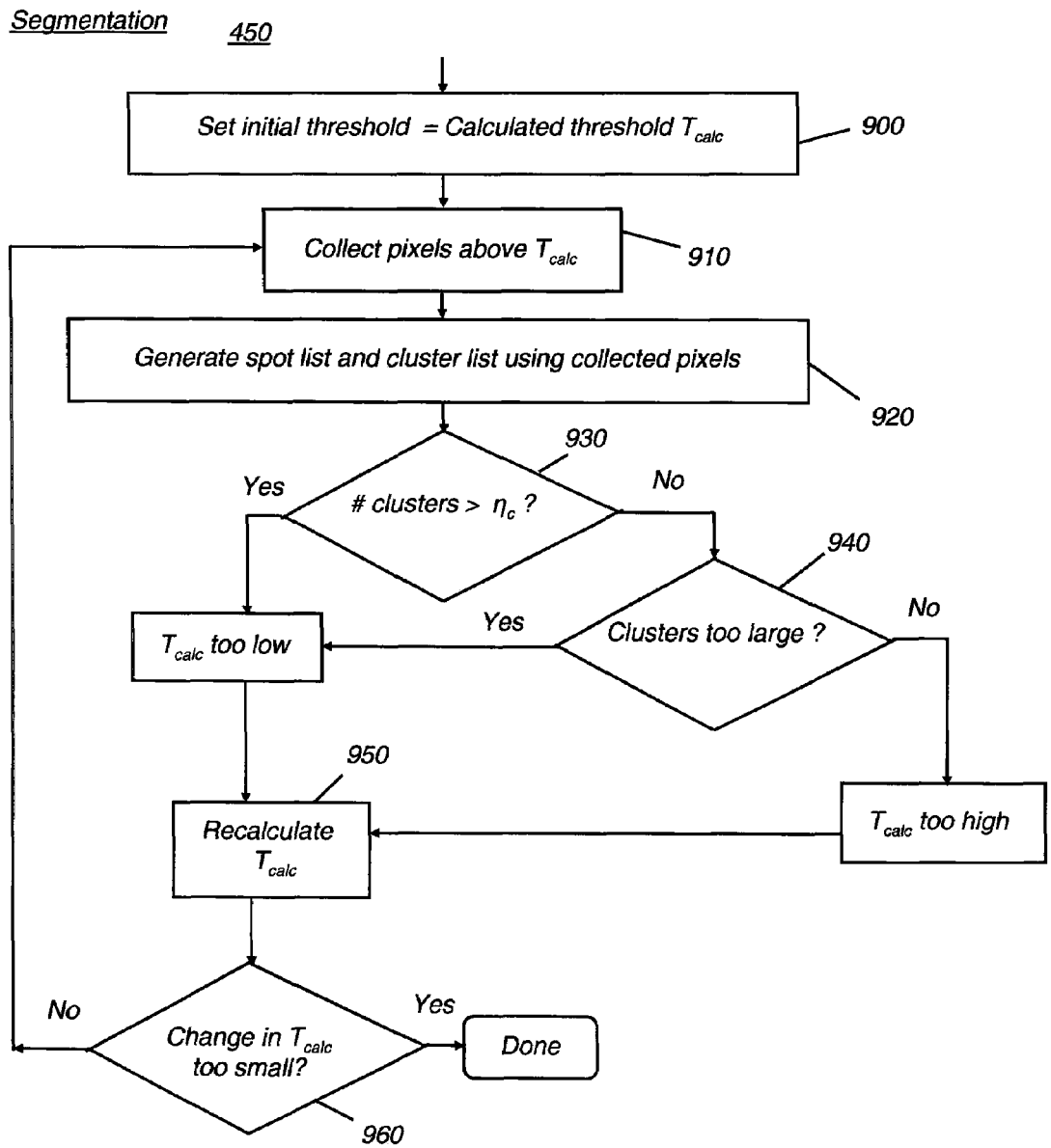
FIG. 8 is a logic flow diagram showing the segmentation process used for generating a set of candidate microcalcification clusters for further analysis.

Referring still to FIG. 4A, a segment MCC clusters step 450 applies an adaptive segmentation algorithm to detect a suitable number of suspected clusters in the enhanced and masked image data and adjust thresholds as needed to obtain this result. FIG. 8 shows the steps of this segmentation logic process in segment MCC clusters step 450. In a setup step 900, an initial threshold value, computed according to statistical data about the image in order to keep a predefined "percentage of segmentation", is assigned as calculated threshold data $T_{calc}$. This initial threshold value is determined based, in part, on the statistical results obtained in extract statistical values step 410 and provides a starting point for subsequent operations. The value of threshold $T_{calc}$ is then tested and recalculated as needed in the control loop logic that follows. A histogram, generated for the artifact-masked cropped image, is used to help determine when a suitable threshold adjustment has been reached, as is described subsequently.

In a pixel segmentation step 910, the image pixels with values above threshold $T_{calc}$ are identified, to be used in steps that follow. In a spot and cluster list generation step 920, image processing logic generates a candidate microcalcification list using the results of pixel segmentation step 910. This candidate microcalcification list is then used to form a candidate microcalcification cluster list, where a microcalcification cluster comprises a set of closely spaced image "spots" that are indicative of microcalcifications.

Features of suspect microcalcifications that can be extracted by image processing relate to intensity and gray level values including mean, minimum, and maximum values, edge and boundary features, typically calculated using gradient analysis on boundaries of the microcalcification region, shape features, analyzed using moments, and texture characteristics such as relative entropy and homogeneity obtained from the spatial distribution of gray levels in the image. Proximity and other factors are used to form suspect microcalcifications into microcalcification clusters. Features that can be extracted for clusters similarly include spatial characteristics using gray level distribution, intensity, and moment analysis, edge and boundary characterization, and shape features.

The microcalcification cluster list generated in spot and cluster list generation step 920 has a certain number of elements; in terms used in mathematical set theory, the number of elements of a set is the cardinal number of the set. The next process, a cardinal number comparison step 930, determines if the number of clusters in this cluster list, that is, the cardinal number of the microcalcification cluster list, exceeds the average number of cluster candidates $\eta_c$ that was calculated in step 420. Where this number of candidates exceeds the calculated value of $\eta_c$, then the calculated threshold $T_{calc}$ is too low. Use of a higher value of threshold value $T_{calc}$ would eliminate a number of microcalcifications and microcalcification clusters formed from grouping those microcalcifications.

Where the cardinal number of the cluster list does not exceed the average number of cluster candidates $\eta_c$, a cluster size evaluation step 940 is executed. For this step, each microcalcification cluster is checked for size within a bounding box of predetermined dimensions, such as 6×6 mm in one embodiment. Microcalcification clusters exceeding this bounding box size are considered too large to represent microcalcifications and are a possible result of a threshold value $T_{calc}$ that is too low. Where microcalcification clusters do not exceed this bounding box size, threshold value $T_{calc}$ may be too high.

Based on the evaluation performed in cardinal number comparison step 930 and in cluster size evaluation step 940, a recalculation step 950 is executed. In recalculation step 950, an incremental value is added to or subtracted from threshold value $T_{calc}$. Each time recalculation step 950 is repeated, threshold value $T_{calc}$ is increased or decreased by an incremental value that is a fraction of the value used the preceding time, such as by half with each successive iteration. Thus, for example, if the first time through this control loop, recalculation step 950 added an incremental value of 4 to threshold value $T_{calc}$, the next iteration of recalculation step 950 would add or subtract an incremental value of 2. The following iteration of recalculation step 950 would then add or subtract a value of 1. With each successive iteration, the segmentation that results is checked, to determine if there was some change in the number of pixels obtained. In this way, this control loop is executed only a limited number of times, with threshold value $T_{calc}$ ultimately converging to some final value. A threshold evaluation step 960 determines when to end the iterative processing and recalculation of threshold value $T_{calc}$.

An analysis of the image intensity histogram is used as one factor for determining the initial threshold and is used throughout the segmentation process of FIG. 8 for determining which pixels are collected and used in pixel segmentation step 910 and subsequent steps. Threshold evaluation step 960 terminates the loop when the recomputed threshold value $T_{calc}$ results in no change or a minimal level of change from the preceding threshold value $T_{calc}$, based on the histogram.

The sequence of steps 900 through 960 given above, carried out as part of segment MCC clusters step 450, thus obtains a segmentation of cluster candidates using an adaptive thresholding technique. Because this technique utilizes the histogram of image density or intensity values from each image itself, rather than performing any type of linear threshold adjustment, it isolates that portion of the image content that contains suspected MCC structures in a way that adapts to the overall characteristics of the tissue and of the image.

Returning to single view MCC processing step 150 in FIG. 4A, segment MCC clusters step 450 is followed by a second series of enhancement, masking, and segmentation steps that are in the same overall sequence as enhance MCC signal step 430, apply artifact and breast masks step 440, and segment MCC clusters step 450. An enhance MCC signal step 460 provides a non-linear image enhancement algorithm to condition image data and enhance any detected MCC clusters. Unlike a linear transformation, this non-linear enhancement uses a re-mapping of pixel intensities. This may use a Look-Up Table (LUT), for example, or other non-linear mapping technique. The non-linear enhancement that is used stretches the dynamic range of image intensities, effectively increasing contrast in the image, particularly for dense areas.

The unwanted enhancement that can be provided to edge effects as a result of enhance MCC signal step 460 necessitates processing to remove the edge effects. In an apply artifact and breast masks step 470, both artifact and breast masks are again used, applied as part of a process to remove these unwanted effects from the image data. Following this, a second segment MCC clusters step 480 is executed, this time on the non-linearly enhanced image. This generates a second set of MCC clusters, using the same basic procedure for segmentation described with reference to the diagram of FIG. 8. That is, segment MCC clusters steps 450 and 480 are similar, each operating upon a version of the image that has been enhanced differently, first linearly (for step 450) and then non-linearly (for step 480).

The logic flow diagram of FIG. 4B is a continuation of steps from the diagram of FIG. 4A. In an add segmentation step 490, segmentation results from steps 450 and 480 are combined. This forms a candidate cluster list that is then used as the basis for further processing to detect microcalcification clusters. As a procedure that might be carried out as part of either or both segmentation steps 450 and 480 above, or executed separately following add segmentation step 490 as in the embodiment shown in FIG. 4B, a local thresholding step 495 is executed. The purpose of local thresholding step 495 is to "repair" any detected microcalcification cluster from segment MCC clusters steps 450 and 480 that has fewer than a predetermined number of microcalcifications or "spots". For example, where a suspected microcalcification cluster has fewer than three microcalcifications, it has been shown particularly valuable to boost the number of microcalcifications for that cluster by slightly lowering the intensity threshold. In this way, slightly weaker microcalcification spots can be added to a cluster.

The operation of local thresholding step 495 is relatively straightforward. A looping operation is performed, examining each microcalcification cluster in the candidate cluster list obtained in add segmentation step 490 or in either of segment MCC clusters steps 450 or 480. Where any cluster contains fewer than the minimum number of microcalcification spots, a localized resegmentation occurs around each detected spot to identify weaker MCC spots that may be just below the threshold value that was initially used. These weaker MCC spots can then be added to the segmentation. This process helps to compensate for localized variations in contrast that can occur in various tissues of the breast structure.

In a first remove False Positives step 500, algorithms are used to detect and remove FP data from the image. This step includes detection and removal of film scratches and line artifacts attributable to the film scanner/digitizer, employing image detection and processing techniques such as those familiar to one skilled in the art of processing digitized images from film.

An extract MCC features step 510 then extracts calcification features for candidate MCC clusters. MCC features can include the following:

Intensity features, characterized by statistics of gray levels, such as mean, minimum, and maximum of pixels on a suspected MCC spot.

Edge and boundary features, characterized by gradient calculated on the MCC spot boundary.

Shape features, primarily characterized using moments.

Texture analysis, basically using the statistical approach to characterize the stochastic properties of the spatial distribution of gray levels in an image.

Specifically, the entropy and homogeneity are calculated. MCC spot feature extraction uses the following procedure:

(i) Update the microcalcification segmentation (there is a threshold around 0.4 mm*0.4 mm of size to determine if a segmentation update is needed);

(ii) Generate the microcalcification list (note that if a microcalcification is bigger that 900 pixels or smaller than 9 pixels, or if the bounding box of the microcalcification is bigger than 1800 pixels, the microcalcification is removed from the microcalcification list); and (iii) Get the features with regard to each microcalcification in the list.

Following this, a second remove False Positive step 520 is executed. As part of this step, a trained neural network classifier executes. In remove False Positive step 520, the neural network classifier applies its set of rules to the MCC spot features that were obtained in extract MCC features step 510. In one embodiment, the classifier software provides a state vector neural network, followed by a kernel-based classifier. Each classifier is trained, using a validated database of mammography images, to make decisions regarding individual MCC spots, based on the characteristic features of each MCC entity.

Neural networks are well known in the image processing arts for their ability to represent non-linear mappings between a set of input variables and a set of output variables. The mappings, executed using the familiar model of successive layers of processing nodes, operate using functions of inputs and weighted values, where the weighted values can be changed iteratively to obtain the desired output as the network is trained. In the present invention, the network topology can be fairly conventional, with the requirement that a feed-forward neural network be utilized, containing no feedback loops. Network outputs are calculated as explicit functions of the inputs and corresponding weighted values. Activation functions for inner layer "hidden" nodes in the neural network are utilized to introduce a measure of non-linearity to the network. The activation functions used can include threshold or sigmoidal functions, such as logistic, tan h, and Gaussian functions.

Figure 9:
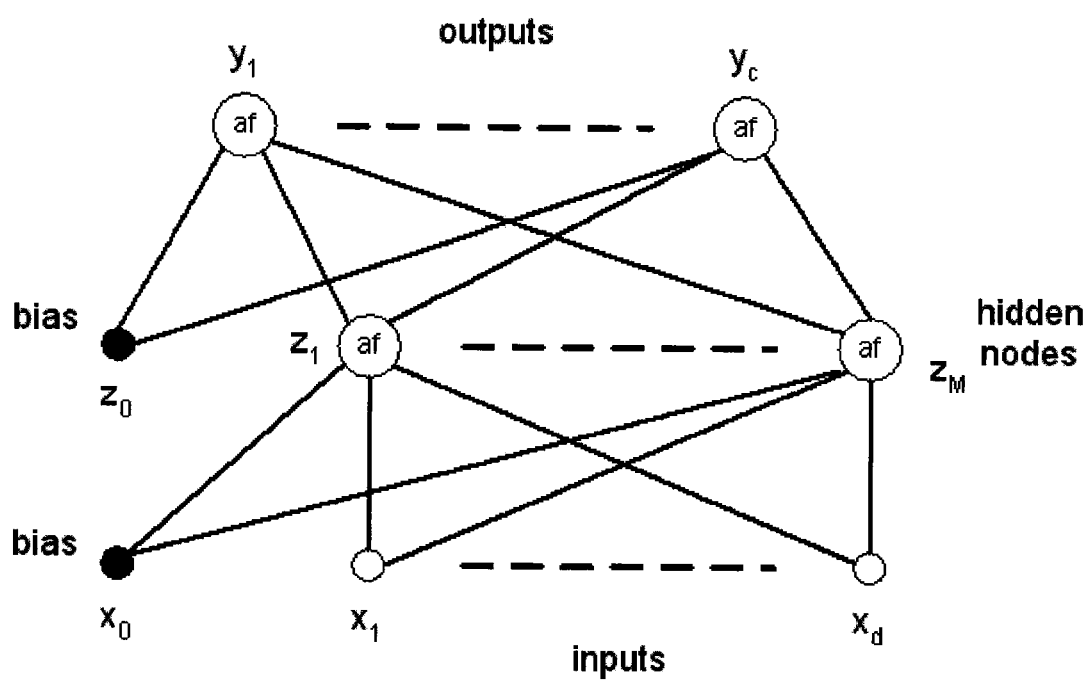
FIG. 9 is a neural network topology diagram.

Referring to FIG. 9, there is shown a typical feed-forward neural network topology that could be translated into the needed mapping function for the classifier. In the layered network of FIG. 9, there are successive layers of processing nodes, with connections between each node in one layer to each node in the next, but with no other connections permitted. For example, each input node $x_0, x_1, x_2, x_3, \ldots x_d$ connects with each hidden node $z_0 z_1, z_2, z_3, \ldots z_M$.

The output of the jth hidden node is obtained by first forming a weighted linear combination of the d input values and adding a bias, to yield:

$$a_{j1} = \Sigma w^{(1)}_{j1,i} x_i + w^{(1)}_{j1,0}$$

wherein $w^{(1)}_{j1,i}$ denotes a weight in the first layer, going from input i to hidden node j, and $w^{(1)}_{j1,0}$ denotes the bias for hidden node j. The activation (af) of hidden node j is obtained by transforming the linear sum using an activation function g(.):

$$z_{j1} = g(a_{j1})$$

The outputs of the network are obtained by transforming the activations of the hidden nodes using a second layer of processing elements:

$$a_{j2} = \Sigma w^{(2)}_{j2,i} z_{j1} + w^{(2)}_{j2,0}$$

wherein $w^{(2)}_{j2,i}$ denotes a weight in the second layer, going from node i to node j, and $w^{(2)}_{j2,0}$ denotes the bias for node i. The activation of the $j2^{th}$ output node using an activation function yields:

$$y_{j2} = g(a_{j2})$$

Note that the use of notation g implies that this activation function need not be the same function as used for hidden nodes. Although the network in FIG. 9 corresponds to a transformation of the input variables by two successive single-layer networks, it is clear that the analytic functions given above represent this class of networks extended further, with successive transformations of the same general kind, corresponding to networks with extra layers of weights. Such general network mappings may have more complex network relationships than layered networks, possibly allowing the activations of all nodes in the network to be evaluated, including those of the output nodes.

The neural network is trained by learning from a set of test images. As the network makes decisions, various variable weight settings are adjusted, so that the accuracy of its decisions can improve. Generally a larger number of training examples is much preferred and improvement is proportional to the size of this set of training examples. In practice, to feature values in one or more training images, thereby allowing repeated attempts with the same set of images under different noise conditions. For example, for any input value $x_i$, a replacement value can be substituted, computed using:

$$\sqrt{\sigma}*GaussianRandom_i()+x_i$$

This technique has been observed to show an improvement in training performance for the neural network of one embodiment of the present invention. Other methods shown to improve the classification performance however, it has been shown that neural network training may not be optimal simply by using a larger training set. To offset this effect, the present invention optimizes neural network training by adding an amount of noise, such as Gaussian white noise, of the neural network include normalization of feature values in the training images, such as using scaling to provide all pixel intensity values between −1 and +1 or normalizing values so that the standard deviation of the value distribution is equal to 1. Still other techniques include presenting the order of the input data $x_i$ randomly during the training iterations and repeating the use of one or more TP or TN images in the test set to increase the ratio of TP or TN images accordingly.

These same training techniques have also been used with a kernel-based classifier used in the same embodiment of the present invention. Both the neural network and the kernel-based classifier, used in combination, provide capable tools for efficiently and accurately ranking both microcalcifications and microcalcification clusters.

At the conclusion of second remove False Positive step 520, there are typically some revisions to the listing of microcalcifications that were originally used to form the candidate clusters in preceding steps. This typically removes some number of suspected microcalcifications that are not likely candidates upon closer scrutiny. To compensate for these changes, a recluster step 525 is next executed, performing any necessary re-clustering operation that results once second remove False Positive step 520 is completed.

An extract cluster features step 530 then is performed to extract cluster features from candidate MCC clusters, following the reclustering operation that was executed in recluster step 525. Cluster features can be grouped as follows:

Spatial features, characterized by gray levels, distributions, intensity, moment of intensity, and the like.
Edge and boundary features.
Shape features.
Texture features, if any.

A classify clusters step 540 is then executed in order to classify candidate MCC clusters. The classify clusters step 540 again employs a neural network, trained in this case to correctly classify MCC clusters, based on a database of test cases.

Finally, an enhance True Positives step 550 is executed for cluster candidates. This image processing process both enhances TP indications and helps to remove FPs that have not yet otherwise been identified. Here, classifier software determines whether or not there are parts of the cluster data that should be enhanced or removed. For example, suspected MCC structures near the skin line may require additional image processing for more reliable evaluation. For other candidate MCC clusters, it can be beneficial to check and adjust localized image contrast to allow more accurate diagnosis.

Each candidate MCC cluster that is obtained following the procedures outlined in FIGS. 4A and 4B is classified by being given a ranking over a range of values between two extreme values, such as between −1 and +1. For example, in one embodiment, a ranking of −1 is considered highly indicative of cancer. A ranking of +1, at the other extreme end of the range, is considered to be indicative of a non-malignant structure. Using this −1 to +1 range, the ranking that is assigned by the classifier to each candidate microcalcification cluster is relative to its likely danger to the patient. Typical rankings for seven candidate MCC clusters, over this range, might be rankings of −1.0, −0.8, −0.3, −0.2, +0.5, +0.5, +1.0, for example.

To improve detection accuracy, the present invention performs classification in multiple ways, both for microcalcifications and for microcalcification clusters. After first processing the image data to obtain a set of candidate microcalcifications, each microcalcification in the set of candidate microcalcifications is first classified using a neural network. Then, each microcalcification is classified using a kernel based classifier. The results of these two classification approaches are then combined to remove FPs and obtain a set of classified microcalcifications. Next, the set of microcalcifications is grouped to form a candidate set of microcalcification clusters.

Classification then continues, with classification of each microcalcification cluster in the set of candidate microcalcification clusters using a neural network. Then, each microcalcification cluster in the set of candidate microcalcification clusters is classified using a kernel based classifier. As with microcalcifications, the results of the two classification processes on microcalcification clusters are combined to remove FPs and obtain a set of classified microcalcification clusters. These classification steps rank both the microcalcifications and microcalcification clusters according to a set of rules, applying the training that has been provided as described above.

Final View Combination Processing

Figure 3:
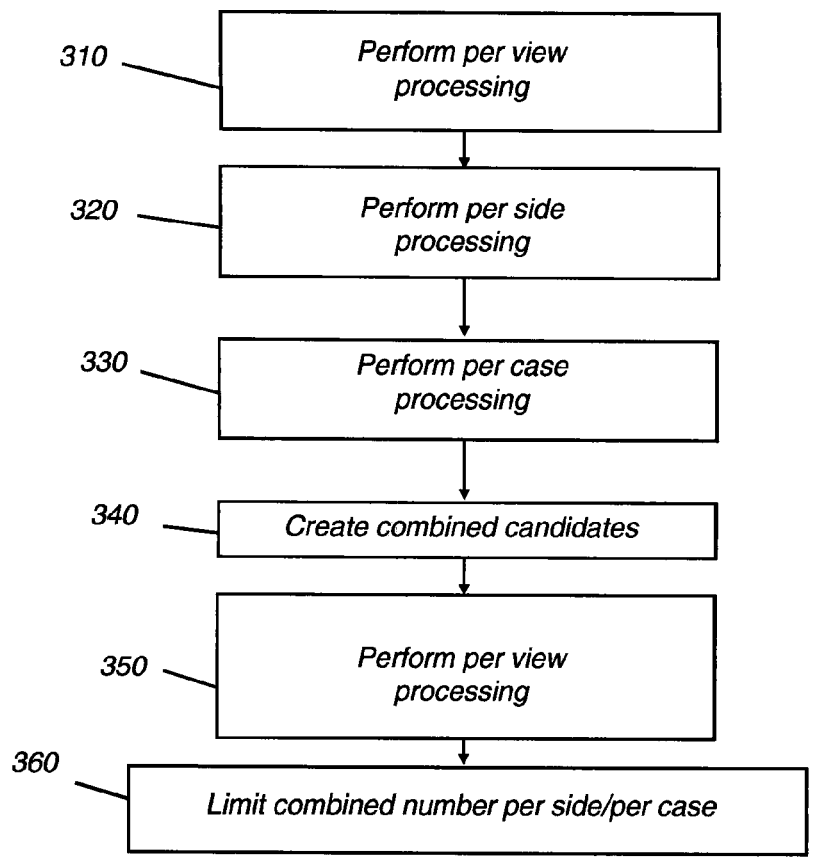
FIG. 3 is a logic flow diagram of final view combination processing.

Referring now to FIG. 3, there is shown the logic steps of a final view combination processing sequence 300. A perform per view processing step 310 executes single view processing sequence 190 of FIG. 1, and single view MCC processing step 150 of FIGS. 4A, and 4B for each X-ray view obtained, typically using CC and MLO views for both right and left breasts. The rankings obtained by the process shown in FIGS. 4A and 4B are then used for perform per view processing step 310. Here, for each view, only a certain limited number of candidate MCC clusters are retained, based on a numeric limit and their relative ranking. In one embodiment, a numeric limit of three candidate MCC clusters is set. Then, using the rankings example give above, only MCC cluster candidates with ranking −1.0, −0.8, and −0.3 would be retained in the cluster candidates set for subsequent processing. Using this example, each left and right MLO and CC view would have three clusters, for a total of 12 MCC clusters. Of course, there may be exceptions, such as where one view may yield a high number of highly ranked clusters, so that a number in excess of a predetermined numeric limit might actually be retained.

It is noted that other types of diagnostic image processing, other than analysis for identifying and classifying MCC clusters, might also be performed in a mammography image processing system. For example, image processing for mass structures might also be performed. The results from mass image processing might be used together with MCC image processing results in a typical diagnostic image mammography system. Some combination of mass and MCC images might be obtained and processed, for example.

Following perform per view processing step 310, a perform per side processing step 320 is executed. Perform per side processing step 320 then prioritizes clusters as ranked, from views for each left and right side, and selects a limited number of MCC cluster candidates from each side. A perform per case processing step 330 then takes, for this session and this patient, a restricted number of candidate microcalcification structures for further processing.

A create combined candidates step 340 then combines the likely candidate structures from preceding processing steps. This step rescales the MCC candidate rankings and executes a proximity mapping algorithm that helps to provide better definition of MCC structures. A perform per view processing step 350 is then executed on each view in order to keep the combined MCC candidate clusters that have higher than a given ranking and to retain a predetermined number of potential candidate clusters in each view. Finally, a limit combined number step 360 is executed in order to restrict the number of MCC cluster candidates being considered to only those most likely. As a result of this process, only those MCC clusters that are of most interest to the diagnostician are highlighted or marked for further examination.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, the method of the present invention is not hardware-dependent, but can be implemented on any of a range of computers or computer workstation types. While the method of the present invention is described primarily with respect to mammography, this method can also be adapted to other types of medical imaging, particularly where it is beneficial to detect clustered structures having characteristic features that are generally well defined.

The invention claimed is:

1. A method for computer-aided detection of microcalcification clusters using a digital computer, comprising steps of:
    a) obtaining digital mammography data for a single view image;
    b) normalizing the single view image data;
    c) filtering the single view image data to reduce the image noise;
    d) generating and applying a first mask to the single view image data for defining the breast structure, forming a first cropped image thereby and generating and applying a second mask to the single view image data for defining the muscle structure, forming a second cropped image thereby;
    e) generating, for each of the first and second cropped images, an artifact mask corresponding to vascular calcifications and known imaging artifacts;
    f) applying, to each of the first and second cropped images, the corresponding artifact mask, defining corresponding first and second artifact-masked cropped images thereby;
    g) processing portions of each artifact-masked cropped image by:
        (g1) applying an enhancement algorithm for enhancing small particles in the artifact-masked cropped image, forming an enhanced artifact-masked cropped image thereby;
        (g2) reducing edge effects introduced by artifacts in the enhanced artifact-masked cropped image; and
        (g3) obtaining a set of microcalcification cluster candidates according to a segmentation threshold;
    h) repeating step g) at least one time for each of the first and second artifact-masked cropped images, using an alternate enhancement algorithm in sub-step (g1);
    i) combining results from steps g) and h) to form a listing of suspected microcalcification clusters;
    j) applying image processing algorithms to remove false positives from the listing of suspected microcalcification clusters to obtain an initial listing of candidate microcalcification clusters;
    k) extracting features of each microcalcification in the candidate microcalcification cluster and classifying each microcalcification to remove false positive microcalcifications;
    l) regrouping the remaining microcalcifications to form a regrouped listing of candidate microcalcification clusters; and
    m) extracting features of each microcalcification cluster in the regrouped listing of candidate microcalcification clusters and classifying each microcalcification cluster in the regrouped microcalcification cluster listing to identify true positives.

2. The method according to claim 1, wherein the step of generating the artifact mask comprises the step of identifying structures exceeding a predetermined boundary size.

3. The method according to claim 1, wherein the step of generating the artifact mask comprises one or more of the following steps:
    (i) detecting artifacts having characteristics of vascular tissue structures;
    (ii) detecting large benign calcifications; and
    (iii) detecting foreign objects in the image.

4. The method according to claim 1, wherein the step of applying an enhancement algorithm in step g(1) comprises the step of applying a linear transformation.

5. The method according to claim 1, wherein the step of applying an enhancement algorithm in step g(1) comprises the step of applying a non-linear transformation.

6. The method according to claim 1, wherein the step of generating a first mask comprises the step of using image contrast characteristics.

* * * * *